US010887929B2

(12) United States Patent
Lai et al.

(10) Patent No.: US 10,887,929 B2
(45) Date of Patent: Jan. 5, 2021

(54) RESOURCE ALLOCATION METHOD AND FULL DUPLEX COMMUNICATION SYSTEM

(71) Applicant: Realtek Semiconductor Corp., Hsinchu (TW)

(72) Inventors: Ting-Wei Lai, Taipei (TW); Hsuan-Jung Su, Taipei (TW); Der-Zheng Liu, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 33 days.

(21) Appl. No.: 16/529,809

(22) Filed: Aug. 2, 2019

(65) Prior Publication Data

US 2020/0119900 A1    Apr. 16, 2020

Related U.S. Application Data

(60) Provisional application No. 62/744,664, filed on Oct. 12, 2018.

(51) Int. Cl.
  *H04L 5/14* (2006.01)
  *H04L 29/06* (2006.01)
  *H04W 76/10* (2018.01)
  *H04W 72/08* (2009.01)

(52) U.S. Cl.
  CPC .............. *H04W 76/10* (2018.02); *H04L 5/14* (2013.01); *H04L 5/143* (2013.01); *H04L 5/1438* (2013.01); *H04L 67/38* (2013.01); *H04W 72/082* (2013.01)

(58) Field of Classification Search
  CPC ...... H04L 5/1438; H04L 5/143; H04W 76/10; H04W 72/082
  See application file for complete search history.

(56) References Cited

U.S. PATENT DOCUMENTS

| 8,547,884 | B2 | 10/2013 | Lo |
| 9,363,066 | B2 | 6/2016 | Lo |
| 9,420,606 | B2 | 8/2016 | Bhushan |
| 9,698,963 | B2 | 7/2017 | Luo |
| 9,839,037 | B2 | 12/2017 | Lo |

(Continued)

OTHER PUBLICATIONS

Liu et al. The Sub-channel Allocation Algorithm in Femtocell Networks Based on Ant Colony Optimization; MILCOM 2012—2012 IEEE Military Communications Conference Year: 2012.*

(Continued)

*Primary Examiner* — Kevin C. Harper
*Assistant Examiner* — Henry Baron
(74) *Attorney, Agent, or Firm* — Winston Hsu

(57) ABSTRACT

The present disclosure provides a resource allocation method. The resource allocation method includes the following steps: selecting multiple first selected virtual nodes according to multiple virtual pheromonal trails on multiple virtual edges, in which the first selected virtual nodes forms at least one virtual tour, and the virtual tour includes multiple first virtual edges; updating the virtual pheromonal trails on the virtual edges according to virtual distances corresponding to the first virtual edges of the virtual tour; selecting multiple second selected virtual nodes according to the updated virtual pheromonal trails on the virtual edges, in which the second selected virtual nodes form at least one resulting virtual tour; allocating the resource blocks to selected user pairs according to the resulting virtual tour.

16 Claims, 6 Drawing Sheets

(56) References Cited

U.S. PATENT DOCUMENTS

| | | |
|---|---|---|
| 10,212,723 B2 | 2/2019 | Jiang |
| 10,298,297 B2 | 5/2019 | Cui |
| 10,368,357 B2 | 7/2019 | Lopez-Perez |
| 10,567,147 B2 | 2/2020 | DiFazio |
| 2018/0213547 A1 | 7/2018 | Ju |
| 2019/0123855 A1 | 4/2019 | Stirling-Gallacher |

OTHER PUBLICATIONS

Sim et al., Ant Colony Optimization for Routing and Load-Balancing: Survey and New Directions; IEEE Transactions on Systems, Man, and Cybernetics—Part A: Systems and Humans, vol. 33, No. 5, Sep. 2003.*

* cited by examiner

RESOURCE ALLOCATION METHOD AND FULL DUPLEX COMMUNICATION SYSTEM

CROSS REFERENCE TO RELATED APPLICATIONS

This application claims the benefit of U.S. provisional application No. 62/744,664, filed on Oct. 12, 2018, which is incorporated herein by reference.

BACKGROUND OF THE INVENTION

1. Field of the Invention

The present disclosure relates to a resource allocation method and a full duplex communication system, and more particularly, to a resource allocation method and a full duplex communication system capable of allocating wireless resources in a multi-cell scenario.

2. Description of the Prior Art

As the demand of wireless service increases, the utilized frequency spectrum is getting crowded, which might degrade the quality of service (QoS) of wireless systems. Enhancing data rate is always a goal for the next-generation mobile communication. Full-duplex (FD) communications, allowing simultaneous transmission and reception on the same frequency carrier(s), attracts more attentions recently, which is expected to be a promising way to increase spectrum efficiency.

Previously, strong self-interference makes FD communications difficult to be realized. Thanks to the breakthroughs in hardware development, self-interference is able to be reduced by 110 dB, which makes FD communications possible to be realized and being able to upgrade the capacity to a new level. Therefore, resource allocation for the FD system is critical.

SUMMARY OF THE INVENTION

It is therefore a primary objective of the present disclosure to provide a resource allocation method and a full duplex communication system capable of allocating wireless resources in a multi-cell scenario.

The present disclosure provides a resource allocation method applied in a full duplex communication system. The full duplex communication system includes multiple stations and multiple user devices, and the full duplex communication system operates on multiple resource blocks. The resource allocation method includes the following steps: selecting first selected virtual nodes according to virtual pheromonal trails on virtual edges, in which the first selected virtual nodes forms at least one virtual tour, and the virtual tour includes first virtual edges; updating the virtual pheromonal trails on the virtual edges according to virtual distances corresponding to the first virtual edges of the virtual tour; selecting second selected virtual nodes according to the updated virtual pheromonal trails on the virtual edges, in which the second selected virtual nodes form at least one resulting virtual tour; and allocating the resource blocks to selected user pairs according to the resulting virtual tour, in which selected user pairs correspond to the resulting virtual tour. The user devices and stations form user pairs, and each user pair includes a downlink user device and an uplink user device, among the user pairs, along with a station among the stations. The user pairs represent virtual nodes, and the first selected virtual nodes are among the virtual nodes. A virtual edge, among the virtual edges, is formed between two virtual nodes among the virtual nodes. The virtual distances are related to data rates.

The present disclosure further provides a full duplex (FD) communication system. The full duplex communication system includes stations, user devices, and a computing device. The full duplex communication system operates on multiple resource blocks. The computing device includes a processing unit and a storage unit. The storage unit stores a program code to be executed by the processing unit to implement the following steps: selecting first selected virtual nodes according to virtual pheromonal trails on virtual edges, in which the first selected virtual nodes form at least one virtual tour, and the virtual tour includes first virtual edges; updating the virtual pheromonal trails on the virtual edges according to virtual distances corresponding to the first virtual edges of the virtual tour; selecting second selected virtual nodes according to the updated virtual pheromonal trails on the virtual edges, in which the second selected virtual nodes form at least one resulting virtual tour; allocating the resource blocks to selected user pairs according to the resulting virtual tour, in which the selected user pairs correspond to the resulting virtual tour. The user devices and stations form user pairs, and each user pair includes a downlink user device and an uplink user device, among the plurality of user pairs, along with a station among the stations. The user pairs represent virtual nodes, and the first selected virtual nodes are among the virtual nodes. A virtual edge, among the virtual edges, is formed between two virtual nodes among the virtual nodes. The virtual distances are related to data rates.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
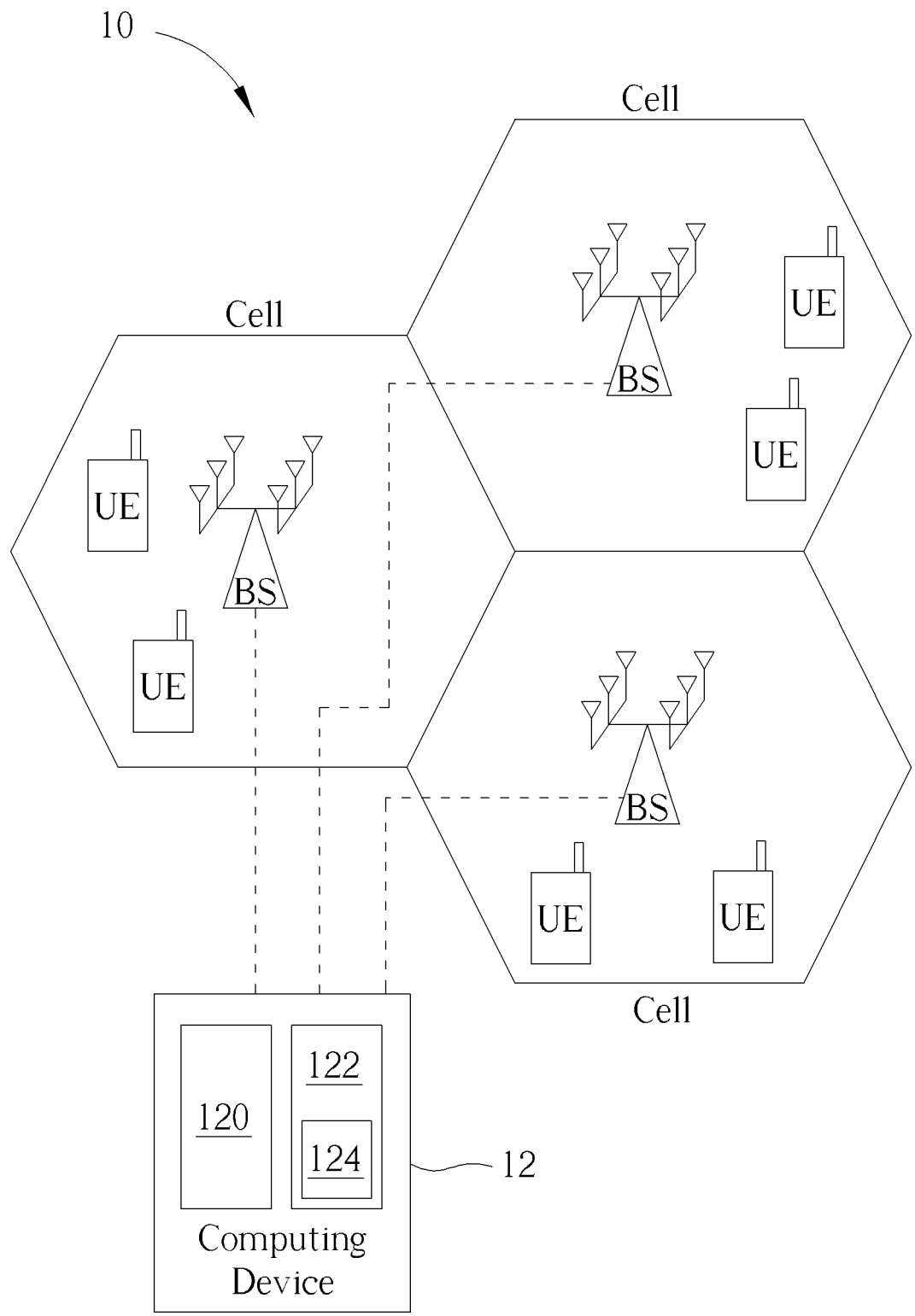
FIG. 1 is a schematic diagram of a full duplex (FD) communication system according to an embodiment of the present disclosure.

FIG. 1 is a schematic diagram of a full duplex (FD) communication system 10 according to an embodiment of the present disclosure. The FD communication system 10 comprises a plurality of stations BS, a plurality of user devices UE and a computing device 12. The user device UE may be a phone, a tablet computer, a laptop and the like. The station BS may be a macro base station in a cellular network scenario. The station BS may also be a femto base station or an access point (AP) in a WLAN (wireless local area network) scenario. The plurality of stations BS correspond to a plurality of cells respectively. The cell represents a service area covered by the corresponding station BS. The cells in FIG. 1 are illustrated as hexagons for exemplary purpose, but not limited thereto. The computing device 12 may be a computer or a server, comprising a processing unit 120 and a storage unit 122. The processing unit 120 may be one or more processor(s), e.g., CPU (central processing unit). The storage unit 122 may be a non-volatile memory (NVM), e.g., an electrically erasable programmable read only memory (EEPROM) or a flash memory. The computing device 12 is coupled to the plurality of stations BS and configured to execute a resource allocation process to obtain a resource allocation scheme. Based on the resource allocation scheme obtained by the computing device 12, the plurality of stations BS allocates wireless resources to the user devices UE, to enhance an overall data rate. The storage unit 122 is configured to store a program code 124 to be executed such that the processing unit 120 to execute the resource allocation method.

The FD communication system 10 operates on a plurality resource blocks RB (not shown in FIG. 1). The resource block RB represents a certain frequency spectrum within a certain period of time. Practically, in an OFDM (orthogonal frequency division multiplexing) system, the resource block RB may represent couples of frequency subcarriers or one subcarrier.

In the FD communication system 10, a plurality of user pairs UP is formed. For example, a user pair $UP_a$ represents a downlink user device $UE_{DL,a}$ and a uplink user device $UE_{UL,a}$ along with a station $BS_b$ within a cell b. When a resource block $RB_c$ is assigned to the user pair $UP_a$ in the cell b, it means that the uplink user device $UE_{UL,a}$ in the cell b transmits data packets to the station $BS_b$ (via an uplink direction) using the resource block $RB_c$ and the station $BS_b$ transmits data packets to the downlink user device $UE_{DL,a}$ (via a downlink direction) in the cell b using the resource block $RB_c$ at the same time. In other words, the plurality of user devices UE and the plurality of stations BS form the plurality of user pairs UP, in which the user pairs UP correspond to the stations BS respectively.

The resource allocation problem for the FD communication system basically refers to determination of which resource block being assigned to which user pair, such that an overall capacity can be maximized. In the present disclosure, the terminologies "capacity", "data rate", "transmission rate", "spectrum efficiency", and "throughput" are used interchangeably. In an embodiment, the capacity or the spectrum efficiency may be evaluated in terms of bps/Hz (bits per second per Hz), or bps (bits per second).

In the present disclosure, a concept of an Ant Colony Optimization (ACO) algorithm is adopted to solve the resource allocation problem for the FD communication system. A traditional ACO routing technique models the establishment of routes based on the mechanisms, used by ant colonies, of establishing and maintaining paths to desirable food sources. Ants randomly choose a path to a food source. On the chosen path, the ants deposit a chemical substance called "pheromone", which allows other ants to follow the pheromone scent and hence the chosen path. When more ants traverse a path, the pheromone deposit on that path gets more intense, thereby allowing more ants to become attracted to and use that path to travel to the food source and back. The concentration of the pheromone scent on paths to food sources evaporates after certain amount of time. Thus, longer and less traveled paths lose their pheromone scent faster than shorter and more traveled paths. For this reason, more ants would choose the shorter/shortest paths to food sources.

Figure 2:
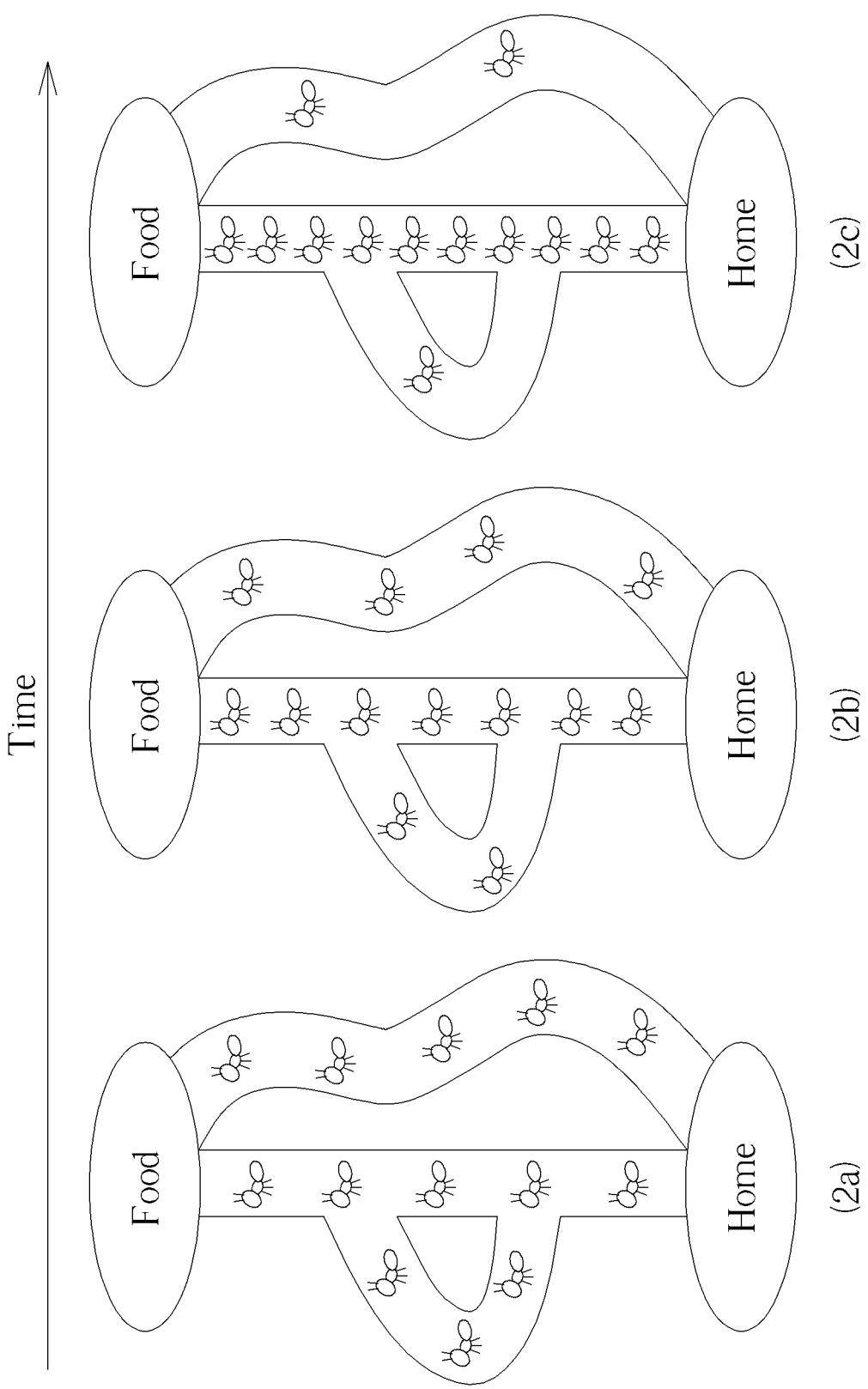
FIG. 2 illustrates schematic diagrams of ants finding food from home.

FIG. 2 illustrates schematic diagrams of ants finding food from home. At the beginning, every ant moves randomly and leaves pheromone on the path through which it passes. Some ants go shorter paths and some go longer, as shown in the subfigure 2a. Next time when the ants leave home, they would sense the pheromone on the path and decide which way to go accordingly, as shown in the subfigure 2b. The higher concentration of pheromone the ants detect, the more probably the ants would follow. On the other hand, the more frequently the path is passed, the more pheromone on that path is retained. Eventually, the ants might find a shortest path, as the subfigure 2c shows.

Specifically, a $(\mathcal{N}, \mathcal{E})$ graph is used to model the routing of the ants in a conventional ACO algorithm, where $\mathcal{N}$ represents a set of nodes including N nodes and $\mathcal{E}$ represents a set of edges including E edges, and the edges are between the nodes. The ACO algorithm operates under three basic assumptions: 1) each ant chooses a node to travel/visit based on a transition probability, which is a function of an edge distance (to the node) and an amount of pheromonal trails left on that edge; 2) each ant would not visit a city twice/again if the tour has not accomplished; 3) the ant lays pheromonal trails on the passed edges after the tour is accomplished. In the present disclosure, the terminologies "pheromonal trail" and "pheromone" are used interchangeably.

Mathematically, during an operation of the conventional ACO algorithm, a transition probability of a $k^{th}$ ant traveling from an $i^{th}$ node (or, a node i) to a $j^{th}$ node (or, a node j) at a time t may be expressed as $$p_{i,j}^k(t) = \begin{cases} \dfrac{[\tau_{i,j}(t)]^\alpha [\eta_{i,j}]^\beta}{\sum_{s \in F_k} [\tau_{i,s}(t)]^\alpha [\eta_{i,s}]^\beta}, & \text{if } j \in F_k \\ 0, & \text{otherwise} \end{cases} \quad \text{(eq. 1)}$$

In eq. 1, $\tau_{i,j}(t)$ represents the (virtual) pheromone left on an edge e(i, j) between the node i to the node j at the time t, $\eta_{i,j}=1/d_{i,j}$ represents the visibility (preference) of the edge e(i,j), and $d_{i,j}$ represents the distance of the edge e(i, j). Parameters $\alpha$ and $\beta$ are used to reflect the significance of the pheromone and the visibility (preference). The set $F_k$ represents a feasible set including the nodes which are allowed to be visited for the $k^{th}$ ant, i.e., feasible for the $k^{th}$ ant, and the feasible set is constrained by the assumption 2 stated above. Once the $k^{th}$ ant accomplishes its tour, the virtual pheromone $\tau_{i,j}(t)$ on the edge e(i,j) may be updated as $$\tau_{i,j}(t+n) = \rho \cdot \tau_{i,j}(t) + \Delta\tau_{i,j}. \quad \text{(eq. 2)}$$

In eq.2, $\rho$ is an evaporation coefficient, meaning that $(1-\rho)$ of the pheromone $\tau_{i,j}(t)$ would be evaporated between the time t and the time (t+n), n is an amount of time which takes the $k^{th}$ ant to finish a tour. In other words, $\rho \cdot \tau_{i,j}(t)$ is the remaining pheromone on the edge e(i, j) at the time (t+n), and $\Delta\tau_{i,j}$ is the newly laid pheromone on the edge e(i, j) between the time t and the time (t+n). The incremental virtual pheromone $\Delta\tau_{i,j}$ may be expressed as $$\Delta\tau_{i,j} = \sum_{k=1}^{K} (\Delta\tau_{i,j}^k). \quad \text{(eq. 3)}$$

In eq.3, $\Delta\tau_{i,j}^k$ represents the pheromone laid by the $k^{th}$ ant on the edge e(i, j) between the time t and the time (t+n), K represents a total number of ants. The incremental pheromone $\Delta\tau_{i,j}^k$ may be expressed as $$\Delta\tau_{i,j}^k = \begin{cases} \frac{Q}{L_k}, & \text{if the } k^{th} \text{ ant passes through the the edge } (i,j) \\ 0, & \text{otherwise} \end{cases} \quad \text{(eq. 4)}$$

In eq. 4, Q can be a constant representing a total amount of pheromone which is to be laid by the ant during its tour, and $L_k$ is the tour length of the $k^{th}$ ant.

The conventional ACO algorithm may be presented as Table I. In Table I, $N_{itr}$ denotes an iteration index, and step, from 1 to n, denotes a step index, meaning that each ant takes n steps to accomplish one tour, where one tour takes n units of time. From Table I, the tours taken by the K ants might converge to a specific tour, meaning that every ant may eventually select the shortest tour to travel, when the iteration index $N_{itr}$ is less than a maximum iteration limit $N_{itr,MAX}$.

TABLE I

```
1  // Initialization
2  Set t = 0
3  Set N_itr = 0
4  Set τ_i,j(t) = c for all edges and Δτ_i,j =0 , for all i,j ∈ 𝒩, where 𝒩 is
   the set of nodes
5  while (N_itr< N_itr,MAX) or (L_k1 ≠ L_k2, ∀ k1, k2∈ {1,...,K}) do
6      Uniformly Place K ants on N nodes
7      Δt = 0
8      for step = 1 to n do
9          Δt = Δt +1
10         for k = 1 to K do
11             Move the k^th ant from node i(step,k) to node j(step,k)
               according to eq. 1
12             Update F_k
13         end
14     end
15     for k = 1 to K do
16         Calculate L_k
17         Update pheromonal trails τ_i,j(t+n) according to eq.2, eq. 3
           and eq. 4
18         Update the shortest tour found
19     end
20     t = t + Δt
21     N_itr = N_itr + 1
22     Reset Δτ_i,j =0 for all i,j ∈ 𝒩
23 end
24 Print Shortest Tour
```

By properly defining the graph ($\mathcal{N}, \mathcal{E}$) the ACO algorithm may be applied to solve the resource allocation problem for the FD communication system. The resource allocation problem for the FD communication system is to assign the plurality of resource blocks RB to the plurality of user pairs UP, such that the overall system data rate can be maximized. In the present disclosure, a virtual node represents a user pair UP within a cell. A virtual edge represents a situation/status that two user pairs UP in two cells are assigned/allocated to the resource blocks RB with the probabilities defined in eq. 1.

Figure 3:
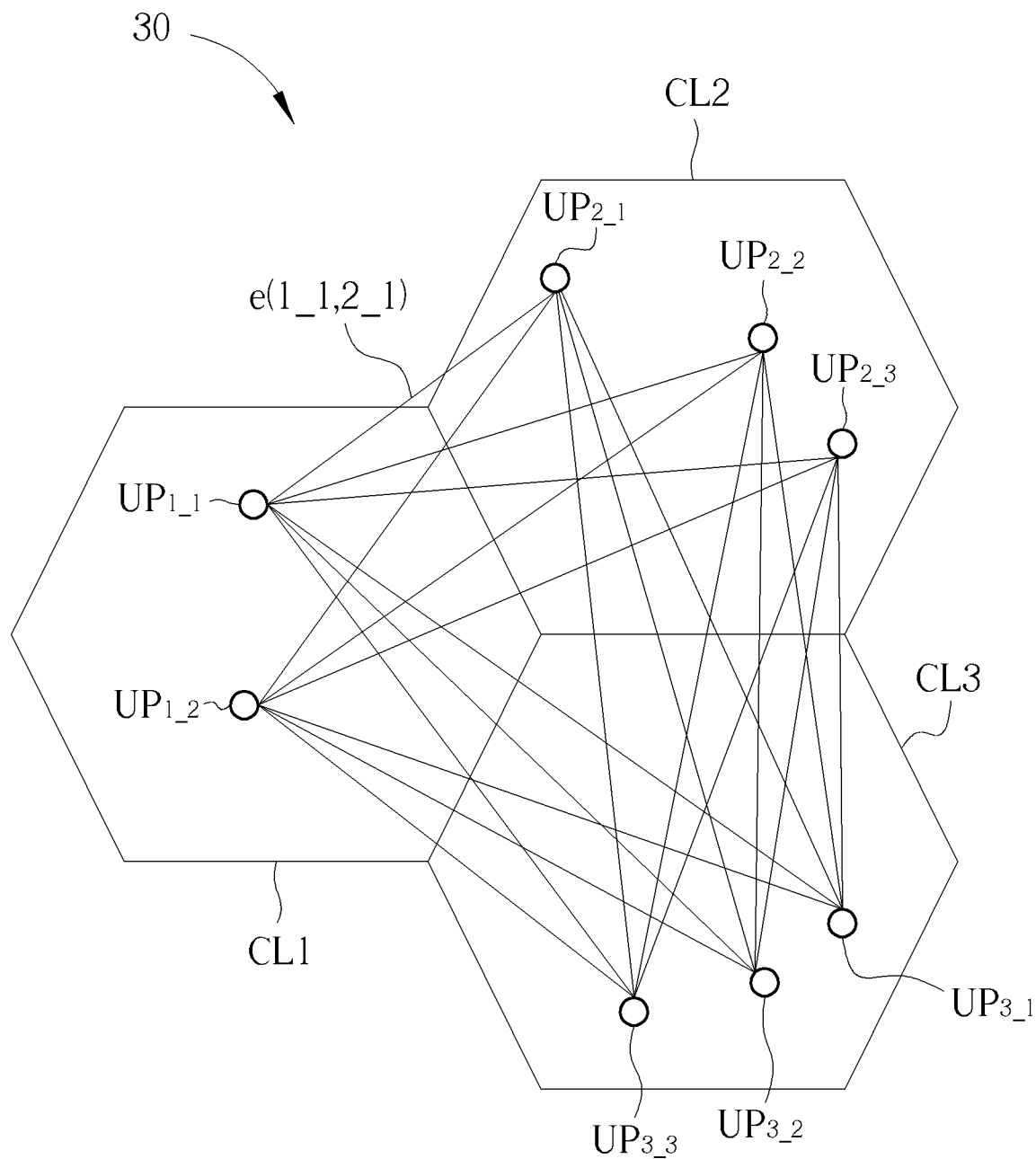
FIG. 3 illustrates a graphic representation of an FD communication system according to an embodiment of the present disclosure.

FIG. 3 illustrates a graphic representation of an FD communication system 30 according to an embodiment of the present disclosure. As shown in FIG. 3, the FD communication system 30 comprises cells CL1-CL3 corresponding to the stations $BS_1$-$BS_3$ (not shown in FIG. 3) respectively. The computing device of the FD communication system 30 is also not shown. User pairs (or virtual nodes) $UP_{1\_1}$-$UP_{1\_2}$, $UP_{2\_1}$-$UP_{2\_3}$, and $UP_{3\_1}$-$UP_{3\_3}$ are within the cells CL1, CL2, CL3, respectively. The straight lines in FIG. 3 represent edges between the virtual nodes $UP_{1\_1}$-$UP_{1\_2}$, $UP_{2\_1}$-$UP_{2\_3}$, $UP_{3\_1}$-$UP_{3\_3}$. The user pair (or the virtual node) $UP_{x,y}$ represents a downlink user device $UE_{DL,y}$ and a uplink user device $UE_{UL,y}$, along with the station BS, corresponding to the cell CLx. In an embodiment, FIG. 3 may be interpreted as there are 4, 6, 6 users within the cells CL1, CL2, CL3, respectively, but not limited therein. In another embodiment, FIG. 3 may be interpreted as there are 2, 3, 3 users within the cells CL1, CL2, CL3, respectively. The terminologies "user" and "user device" are used interchangeably in the present disclosure. Note that, the virtual node $UP_{x\_y}$ illustrated in FIG. 3 has nothing to do with practical positions of the downlink user device $UE_{DL,y}$ and the uplink user device $UE_{UL,y}$, in the cell CLx.

A virtual edge e(1_1, 2_1) between the virtual nodes $UP_{1\_1}$ and $UP_{2\_1}$ represents that a specific resource block RB is allowed to be allocated to the user pair $UP_{1\_1}$ in the cell CL1 and the user pair $UP_{2\_1}$ in the CL2. Since one resource block RB is assigned to only one user pair in one cell, as shown in FIG. 3, there is no edge between virtual nodes within the same cell.

In an embodiment, a virtual edge distance $d_{x1\_y1,x2\_y2}$ of a virtual edge e(x1_y1, x2_y2) between the virtual node $UP_{x1\_y1}$ in the cell CLx1 and the virtual node $UP_{x2\_y2}$ in the cell CLx2 may be defined as $$d_{x1\_y1,x2\_y2} = \frac{\text{interference}(UP_{x1,y1} \text{ to } UP_{x2,y2})}{\text{Rate}(UP_{x2,y2})}. \quad \text{(eq. 5)}$$

In another embodiment, the virtual edge distance $d_{x1\_y1,x2\_y2}$ of the edge between the virtual node $UP_{x1\_y1}$ and the virtual node $UP_{x2\_y2}$ may be defined as $$d_{x1\_y1,x2\_y2} = \frac{1}{\text{Rate}(UP_{x1,y1} + UP_{x2,y2})}. \quad \text{(eq. 6)}$$

In eq. 5, the term "Rate $(UP_{x2,y2})$" may be a summation of transmission rates of downlink and uplink corresponding to user pair $UP_{x2,y2}$ and the term "interference($UP_{x1,y1}$ to $UP_{x2,y2}$)" may be interference caused by the user pair $UP_{x1,y1}$ to $UP_{x2,y2}$. In eq. 6, the term "Rate ($UP_{x1,y1}$+ $UP_{x2,y2}$)" may be a summation of transmission rates of downlinks and uplinks corresponding to user pairs $UP_{x1,y1}$ and $UP_{x2,y2}$, respectively. The transmission rate corresponding to each link may be expressed as $$R = \log_2(1 + SINR) = \log_2\left(1 + \frac{\text{signal power}}{\text{interference} + \text{noise}}\right). \quad \text{(eq. 7)}$$

In eq.7, the term "interference" represents an undesired signal power received at the user device UE and/or the station BS, and the term "signal power" represents desired signal power received at either the user device UE or the station BS.

Figure 4:
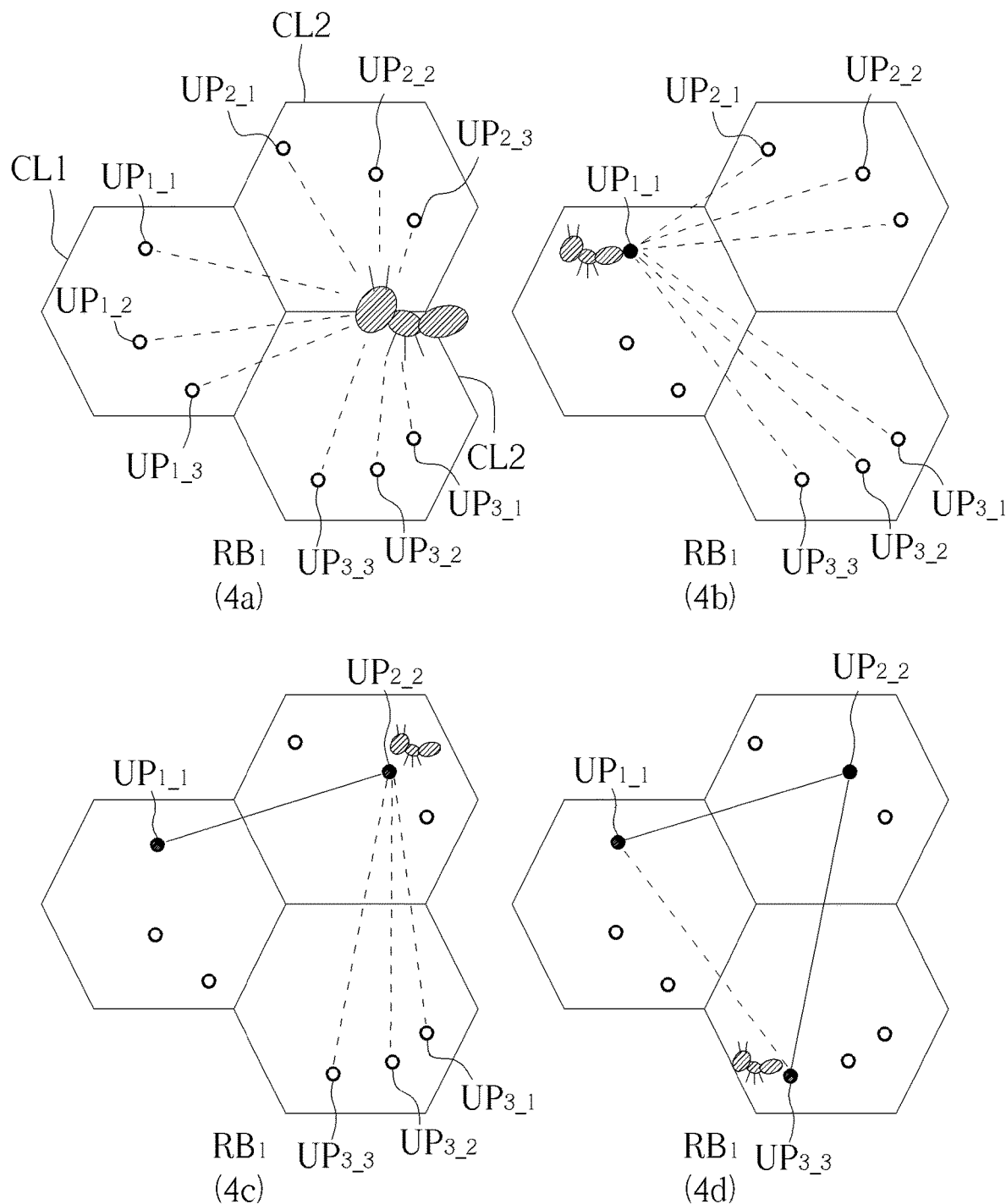
FIG. 4 illustrates a virtual path corresponding to a resource block according to an embodiment of the present disclosure.

FIG. 4 illustrates how the $k^{th}$ ant travels between the virtual nodes $UP_{1\_1}$-$UP_{1\_3}$, $UP_{2\_1}$-$UP_{2\_3}$, $UP_{3\_1}$-$UP_{3\_3}$, to allocate a resource block $RB_1$. At the beginning, as shown in the subfigure 4a, the $k^{th}$ ant has 9 options, which means that the $k^{th}$ ant is allocated to one of the virtual nodes $UP_{1\_1}$-$UP_{1\_3}$, $UP_{2\_1}$-$UP_{2\_3}$, $UP_{3\_1}$-$UP_{3\_3}$, as a starting point. The feasible set Fk for the $k^{th}$ ant is Fk={$UP_{1\_1}$-$UP_{1\_3}$, $UP_{2\_1}$-$UP_{2\_3}$, $UP_{3\_1}$-$UP_{3\_3}$}. The decision of the $k^{th}$ ant choosing the starting point may be based on a plurality of initial probabilities, which will be described later on.

In an embodiment, the $k^{th}$ ant may be placed at the virtual node $UP_{1\_1}$, for example, as the starting point (or a first selected virtual node), as shown in the subfigure 4b. It means that the resource block $RB_1$ may be assigned to the user pair $UP_{1\_1}$. The feasible set for the $k^{th}$ ant shrinks as Fk={$UP_{2\_1}$-$UP_{2\_3}$, $UP_{3\_1}$-$UP_{3\_3}$} by removing $UP_{1\_1}$-$UP_{1\_3}$ in the cell CL1, meaning that the $k^{th}$ ant has 6 options to move on for the next step.

In an embodiment, the $k^{th}$ ant may choose the virtual node $UP_{2\_2}$, for example, as the second visited virtual node (or a second selected virtual node), as shown in the subfigure 4c. An edge is formed between the virtual nodes $UP_{1\_1}$ and $UP_{2\_2}$, meaning that the resource block $RB_1$ may have potential to be assigned to the user pairs $UP_{1\_1}$ and $UP_{2\_2}$. After the $k^{th}$ ant chooses the virtual node $UP_{2\_2}$, the feasible set for the $k^{th}$ ant shrinks as {$UP_{3\_1}$-$UP_{3\_3}$} by removing $UP_{2\_1}$-$UP_{2\_3}$ in the cell CL2, meaning that the $k^{th}$ ant has 3 options to move on for the next step.

In an embodiment, the $k^{th}$ ant may choose the virtual node $UP_{3\_3}$, for example, as the third visited virtual node (or a third selected virtual node), as shown in the subfigure 4d. The decision made by the $k^{th}$ ant to choose the next virtual node to visit may be based on a plurality of transition probabilities, which is similar to eq. 1 and will be detailed later on. After the $k^{th}$ ant chooses the virtual node $UP_{3\_3}$, the $k^{th}$ ant goes back to the starting point $UP_{1\_1}$, and finishes a first part of its tour, which is corresponding to the resource block $RB_1$. The virtual path shown in FIG. 4 means that the resource block $RB_1$ may be assigned to the user pairs $UP_{1\_1}$ in the cell CL1, $UP_{2\_2}$ in the cell CL2 and $UP_{3\_3}$ in the cell CL3.

Figure 5:
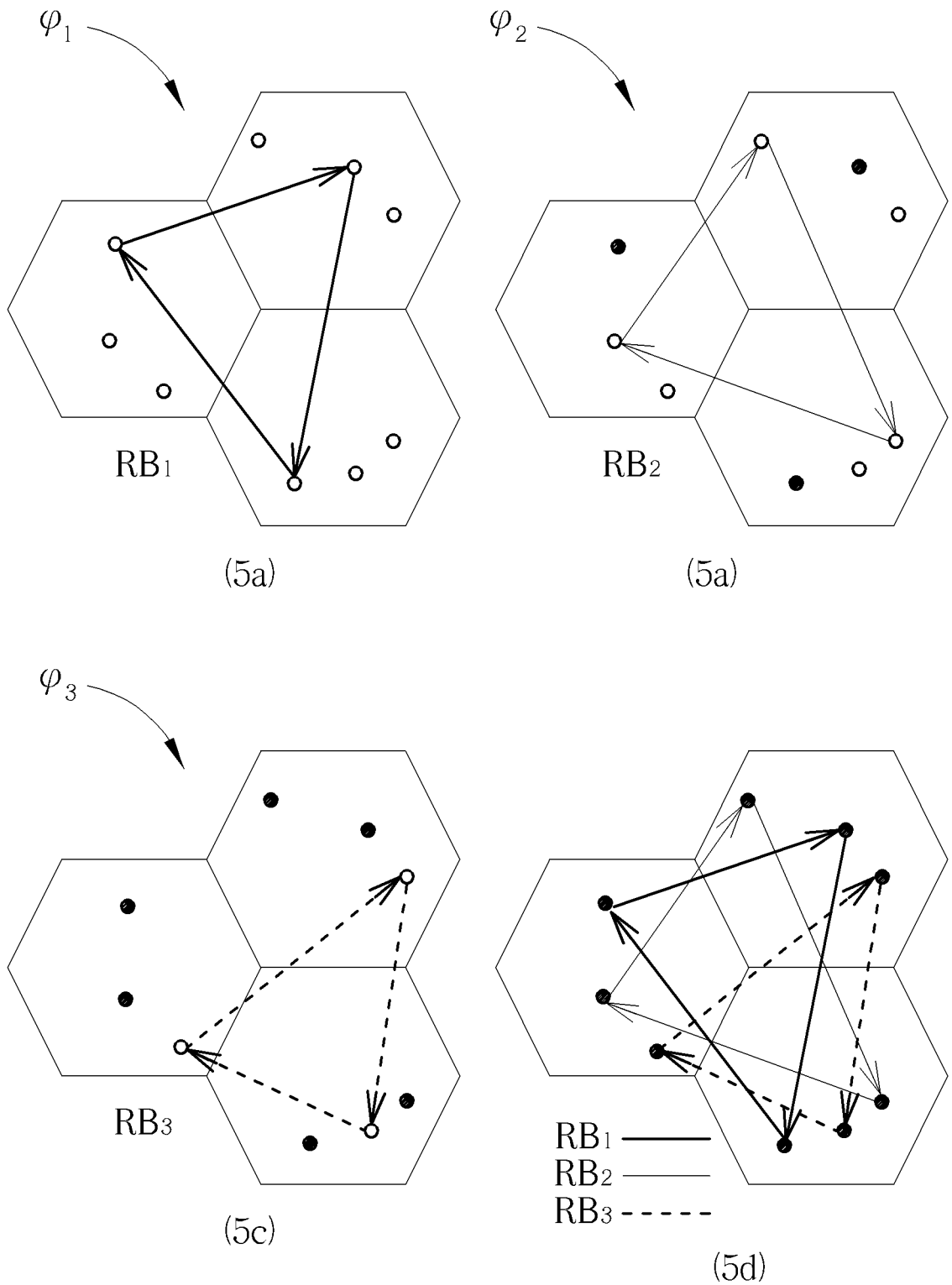
FIG. 5 illustrates a plurality of virtual paths corresponding to a plurality of resource blocks according to an embodiment of the present disclosure.
Figure 6:
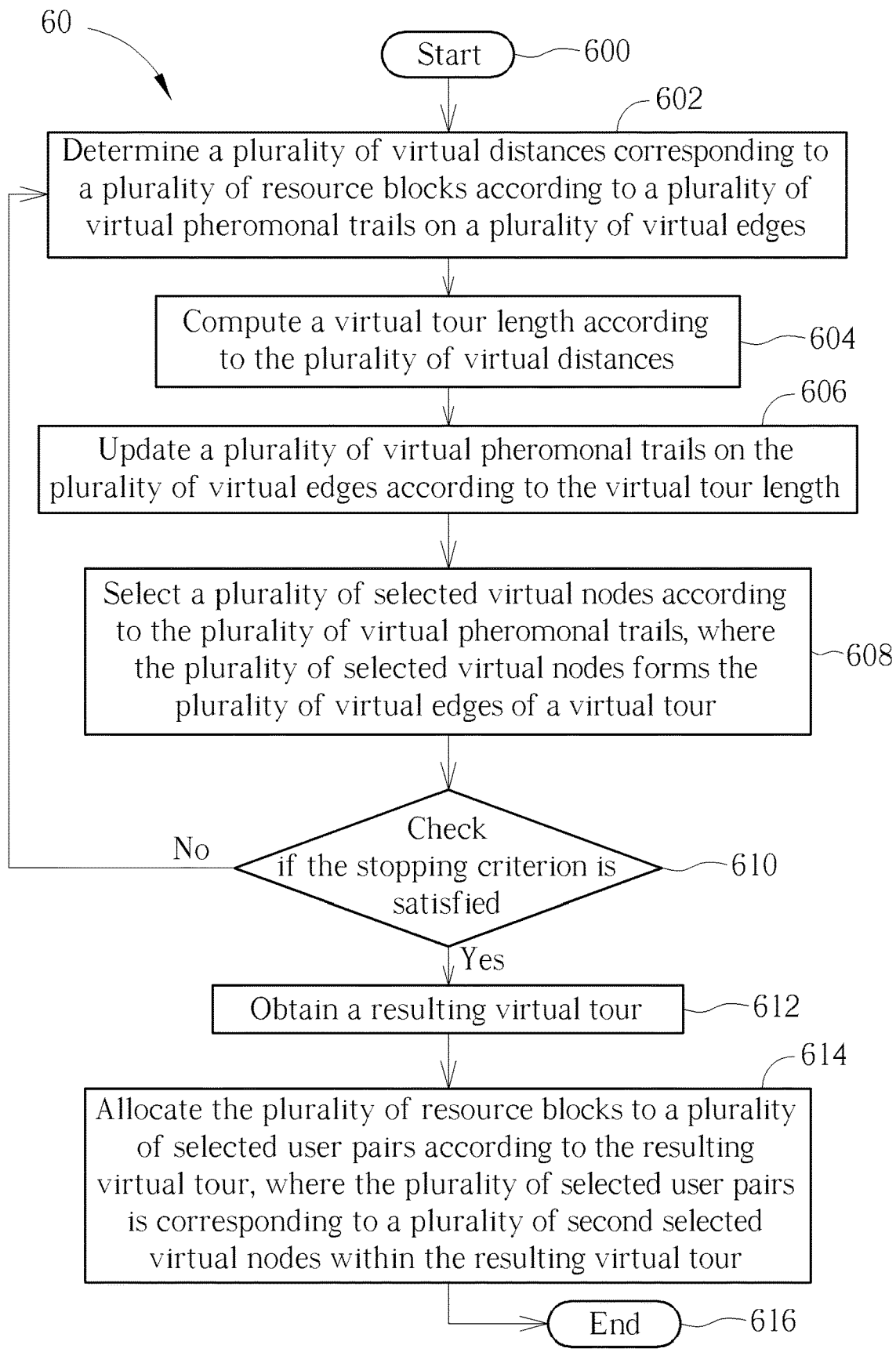
FIG. 6 is a schematic diagram of a resource allocation method according to an embodiment of the present disclosure.

Specifically, FIG. 5 illustrates virtual paths φ1-φ3 of the $k^{th}$ ant to allocate resource blocks $RB_1$-$RB_3$. The virtual paths φ1-φ3, corresponding to the resource blocks $RB_1$-$RB_3$, are illustrated in the subFIGS. 5a-5c, respectively. The subfigure 5d illustrates a combination of the virtual paths φ1-φ3. The virtual paths φ1, φ2 and φ3 may be regarded as the first part, the second part and the third part of one tour $\lambda_k$ for of the $k^{th}$ ant, respectively, and form the tour $\lambda_k$.

Given the user pairs UP have been analogized as the (virtual) nodes, to apply the ACO algorithm to the resource allocation problem in the FD communication system, it is necessary to provide a proper analogy of the tour length $L_k$. In general, supposed that there are NRB resource blocks $RB_1$-$RB_{NRB}$ to be allocated within the FD communication system, the virtual paths $\varphi_1$-$\varphi_{NRB}$ form the virtual tour $\lambda_k$ of the $k^{th}$ ant, i.e., $\lambda_k$=φ1+ . . . +$\varphi_{NRB}$. Or, equivalently, the virtual tour $\lambda_k$ includes the virtual paths $\varphi_1$-$\varphi_{NRB}$, and each virtual path $\varphi_m$ includes a plurality of virtual edges e(x1_y1, x2_y2). Therefore, a virtual tour length $\Lambda_k$ corresponding to the virtual tour $\lambda_k$ may be expressed as $$\Lambda_k = \text{Length}(\lambda_k) = \text{Length}(\varphi_1) + \ldots + \text{Length}(\varphi_{NRB}) \quad\quad (\text{eq. 8})$$
$$= d_k(RB_1) + \ldots + d_k(RB_{NRB}).$$

In eq. 8, Length(•) represents a function outputting a virtual length/distance corresponding to a virtual tour or a virtual path, and $d_k(RB_m)$ represents a virtual distance of the virtual path $\varphi_m$ corresponding to the resource block $RB_m$. In an embodiment, the virtual distance $d_k(RB_m)$ may be expressed as $$d_k(RB_m) = \sum_{\substack{x1\_y1 \\ x2\_y2}} d_{x1\_y1,x2\_y2}(RB_m), \forall\, UP_{x1\_y1}, UP_{x2\_y2} \in \varphi_m. \quad (\text{eq. 9})$$

In eq. 9, the virtual edge distance $d_{x1\_y1,x2\_y2}(RB_m)$ may be obtained according to eq. 5 or eq. 6, given that the resource block $RB_m$ is assigned to the user pairs $UP_{x1\_y1}$, $UP_{x2\_y2}$, and $UP_{x1\_y1}$, $UP_{x2\_y2} \in \varphi_m$ represents that the virtual nodes $UP_{x1\_y1}$, $UP_{x2\_y2}$ are on the virtual path $\varphi_m$.

Given the virtual tour length $\Lambda_k$ has been analogized as the actual tour length $L_k$, the modified ACO algorithm is presented in Table II, which is applied in the resource allocation problem in the FD communication system of the present disclosure.

TABLE II

| | |
|---|---|
| 1 | // Initialization |
| 2 | Set t = 0 |
| 3 | Set $N_{itr}$ = 0 |
| 4 | Set $\tau_{i,j}$(t) = c for all edges and $\Delta\tau_{i,j}$ = 0 , $\forall i \in \mathcal{N}_{b1}$, $\forall j \in \mathcal{N}_{b2}$, $\forall i,j \in \mathcal{B}, i \neq j$, , where $\mathcal{N}_{b1}$ is the set of nodes in cell $b_1$, $\mathcal{N}_{b1}$ is the set of nodes in cell $b_2$, $\mathcal{B}$ is the set of BSs |
| 5 | while ($N_{itr} < N_{itr,MAX}$) or ($L_{k1} \neq L_{k2}$, $\forall$ k1, k2 $\in$ {1,...,K}) do |
| 6 |   for r = 1 to NRB do |
| 7 |     $\Delta t$ = 0 |
| 8 |     for step = 1 to NBS do |
| 9 |       $\Delta t = \Delta t + 1$ |
| 10 |       for k = 1 to K do |
| 11 |         Define: $UP_{i(r,step,k)}$ : a virtual node which the $k^{th}$ ant stays at "step" of $r^{th}$ RB |
| 12 |         if step = 1 and r $\neq$ 1 then |
| 13 |           The $k^{th}$ ant chooses the virtual node $UP_{i(r,step,k)}$ as the starting point |
| 14 |         else if step=1 and r=1 |
| 15 |           Uniformly Place the K ants on the (N•NBS) node to determine $UP_{i(1,1,k)}$ |
| 16 |         else |
| 17 |           The $k^{th}$ ant moves to the virtual node $UP_{j(r,step,k)}$ from virtual node $UP_{i(r,step,k)}$ where $UP_{i(r,step+1,k)} = UP_{j(r,step,k)}$ |
| 18 |         end |
| 19 |         Update $F_k$ |
| 20 |       end |
| 21 |     end |
| 22 |   end |

TABLE II-continued

```
23    for k = 1 to K do
24        Calculate Λ_k according to eq. 8
25        Update pheromonal trails according to eq.2, eq. 3 and eq. 4, where L_k in eq. 4 is
          replaced with Λ_k
26        Update the shortest tour found
27    end 28    t = t + Δt
29    N_itr = N_itr + 1
30    Reset Δτ_{i,j} =0, ∀i∈ 𝒩_b1, ∀j∈ 𝒩_b2, ∀i,j∈ ℬ, i≠j,
31  end
32  Print Shortest Tour
```

In Table II, the virtual node indices x_y have been abbreviated as the indices i or j. N, NBS, NRB represent a number of user pairs within one cell, a number of stations BS and a number of resource blocks RB. The ants presented in Table II are artificial ants, meaning that the processing unit 120 may simulate the behavior of the artificial ants. In some embodiments, N could be different in different cells.

On Line 10 of Table II, the $k^{th}$ ant chooses to start from the virtual node $UP_{i(r,step,k)}$ according to a plurality of initial probabilities $p_I$. In an embodiment, the initial probabilities $p_{I,i}{}^k$, corresponding to the virtual node $UP_i$ for the $k^{th}$ ant may be expressed as $$p_{1,i}^k = \begin{cases} \dfrac{[\text{Rate}(UP_i)]}{\sum\limits_{s\in Fk}[\text{Rate}(UP_s)]}, & \text{if } i \in Fk \\ 0, & \text{otherwise} \end{cases} \quad (\text{eq. 10})$$

In an embodiment, the $k^{th}$ ant may choose a virtual node based on the initial probabilities $p_{I,i}{}^k$.

On line 13, the $k^{th}$ ant may choose the virtual node UP, based on the initial probabilities $p_{i,j}{}^k(t)$. In some embodiments, line 13 can be replaced by line 15 in Table II.

On Line 17 of Table II, the $k^{th}$ ant chooses to move to the virtual node $UP_i$ from virtual node $UP_i$ according to the transition probability $p_{i,j}{}^k(t)$ shown in eq. 1. On Line 25 of Table II, the virtual tour length $\Lambda_k$ is substituted as the tour length $L_k$ into eq.4, such that the virtual pheromonal trail $\tau_{i,j}(t)$ is updated according to eq. 2 and eq. 3. In an embodiment, the $k^{th}$ ant may choose the virtual node $UP_j$ based on the initial probabilities $p_{i,j}{}^k(t)$.

Operations of the ACO algorithm applied in the resource allocation problem in the FD communication system may be summarized as a resource allocation method 60. The resource allocation method 60 may be compiled as the program code 124 to instruct the processing unit 120 to execute the resource allocation method 60.

In the resource allocation method 60, Step 602 may be referred to the computation of the virtual distances $d_k(RB_1), \ldots, d_k(RB_{NRB})$ in eq. 9, which may be referred back to eq. 5 or eq. 6. Step 604 may be referred to the operation of Line 24 in Table II or the computation of eq. 8. Step 606 may be referred to the operation of Line 25 in Table II or the computation of eq.2, eq. 3 and eq. 4. Step 608 may be referred to the operation of Lines 8-22 in Table II, which has been illustrated in FIG. 4 and FIG. 5. In Step 610, the stopping criterion is presented on Line 5 of Table II. The resulting tour obtained in Step 612 may be referred to the shortest tour in Line 32 of Table II, in which the resulting tour $\lambda^*$ is obtained.

The resulting tour $\lambda^*$ includes virtual paths $\varphi_1^*$-$\varphi_{NRB}^*$ corresponding to the resource blocks $RB_1$-$RB_{NRB}$ respectively. In step 614, according to the resulting tour $\lambda^*$, the resource block $RB_m$ is allocated to the user pairs corresponding to the virtual nodes on the virtual path $\varphi_m^*$.

Note that, since the virtual distance or the virtual tour length is inversely proportional to the data rate, or the virtual distance or the virtual tour length decreases as the data rate increases, the shortest tour would bring the largest data rate.

In summary, the present disclosure utilizes the ACO algorithm to perform multi-cell resource allocation, which maximizes the system data rate for the FD multi-cell communication systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A resource allocation method, applied in a full duplex communication system comprising a plurality of stations and a plurality of user devices, wherein the full duplex communication system operates on a plurality of resource blocks, and the resource allocation method comprises the following steps:
   selecting a plurality of first selected virtual nodes according to a plurality of virtual pheromonal trails on a plurality of virtual edges, wherein the plurality of first selected virtual nodes form at least one virtual tour, and the virtual tour comprises a plurality of first virtual edges;
   updating the plurality of virtual pheromonal trails on the virtual edges according to virtual distances corresponding to the first virtual edges of the virtual tour;
   selecting a plurality of second selected virtual nodes according to the updated virtual pheromonal trails on the virtual edges, wherein the plurality of second selected virtual nodes forms at least one resulting virtual tour;
   allocating the plurality of resource blocks to a plurality of selected user pairs according to the resulting virtual tour, wherein the plurality of selected user pairs correspond to the resulting virtual tour;
   wherein the plurality of user devices and the plurality of stations forms a plurality of user pairs, and each user pair comprises a downlink user device and a uplink user device, among the plurality of user pairs, along with a station among the plurality of stations;
   wherein the plurality of user pairs represents a plurality of virtual nodes, and the plurality of first selected virtual nodes is among the plurality of virtual nodes;

wherein a virtual edge, among the plurality of virtual edges, is formed between two virtual nodes among the plurality of virtual nodes;

wherein the virtual distances are related to data rates.

2. The resource allocation method of claim 1, wherein the step of updating the plurality of virtual pheromonal trails on the virtual edges comprises:

calculating the virtual distances corresponding to the first virtual edges of the virtual tour;

determining incremental virtual pheromones corresponding to the first virtual edges of the virtual tour according to the virtual distances corresponding to the first virtual edges of the virtual tour; and updating the plurality of virtual pheromonal trails on the virtual edges according to the incremental virtual pheromones.

3. The resource allocation method of claim 1, wherein a first virtual distance corresponding to a first virtual edge is inversely proportional to data rates of first virtual nodes between which the first virtual edge is formed.

4. The resource allocation method of claim 1, wherein a first virtual distance corresponding to a first virtual edge is inversely proportional to a data rate of one of first virtual nodes, in which the first virtual edge is formed between the first virtual nodes.

5. The resource allocation method of claim 1, wherein the step of selecting the first selected virtual nodes further comprises:

forming a first feasible set comprising all or a part of the plurality of virtual nodes;

selecting a third selected virtual node from the first feasible set, wherein the third selected virtual node is within a first cell;

forming a second feasible set by removing a plurality of first virtual nodes within the first cell from the first feasible set, wherein the second feasible set comprises a plurality of second virtual nodes; and selecting a fourth selected virtual node from the second feasible set.

6. The resource allocation method of claim 5, wherein the step of selecting the third selected virtual node comprising:

selecting the third selected virtual node according to a plurality of initial probabilities corresponding to the plurality of virtual nodes.

7. The resource allocation method of claim 6, wherein distribution of the initial probabilities is uniform distribution.

8. The resource allocation method of claim 5, further comprising:

computing a plurality of transition probabilities corresponding to the plurality of second virtual nodes according to the plurality of virtual pheromonal trails on the plurality of virtual edges, wherein each transition probability is corresponding to a transition from the third selected virtual node to a second virtual node of the plurality of second virtual nodes; and selecting the fourth selected virtual node according to the plurality of transition probabilities.

9. A full duplex (FD) communication system comprising:

a plurality of stations and a plurality of user devices, wherein the full duplex communication system operates on a plurality of resource blocks; and a computing device comprising a processing unit and a storage unit, wherein the storage unit is configured to store a program code to be executed by the processing unit to perform the following steps:

selecting a plurality of first selected virtual nodes according to a plurality of virtual pheromonal trails on a plurality of virtual edges, wherein the plurality of first selected virtual nodes form at least one virtual tour, and the virtual tour comprises a plurality of first virtual edges;

updating the plurality of virtual pheromonal trails on the virtual edges according to virtual distances corresponding to the first virtual edges of the virtual tour;

selecting a plurality of second selected virtual nodes according to the updated virtual pheromonal trails on the virtual edges, wherein the plurality of second selected virtual nodes form at least one resulting virtual tour allocating the plurality of resource blocks to a plurality of selected user pairs according to the resulting virtual tour, wherein the plurality of selected user pairs correspond to the resulting virtual tour;

wherein the plurality of user devices and the plurality of stations forms a plurality of user pairs, and each user pair comprises a downlink user device and a uplink user device, among the plurality of user pairs, along with a station among the plurality of stations;

wherein the plurality of user pairs represents a plurality of virtual nodes, and the plurality of first selected virtual nodes is among the plurality of virtual nodes;

wherein a virtual edge, among the plurality of virtual edges, is formed between two virtual nodes among the plurality of virtual nodes;

wherein the virtual distances are related to data rates.

10. The FD communication system of claim 9, wherein the step of updating the plurality of virtual pheromonal trails on the virtual edges comprises:

calculating the virtual distances corresponding to the first virtual edges of the virtual tour;

determining incremental virtual pheromones corresponding to the first virtual edges of the virtual tour according to the virtual distances corresponding to the first virtual edges of the virtual tour; and updating the plurality of virtual pheromonal trails on the virtual edges according to the incremental virtual pheromones.

11. The FD communication system of claim 9, wherein a first virtual distance corresponding to a first virtual edge is inversely proportional to data rates of first virtual nodes between which the first virtual edge is formed.

12. The FD communication system of claim 9, wherein a first virtual distance corresponding to a first virtual edge is inversely proportional to a data rate of one of first virtual nodes, in which the first virtual edge is formed between the first virtual nodes.

13. The FD communication system of claim 9, wherein the program code is executed by the processing unit to further perform the following steps:

forming a first feasible set comprising all or a part of the plurality of virtual nodes;

selecting a third selected virtual node from the first feasible set, wherein the third selected virtual node is within a first cell;

forming a second feasible set by removing a plurality of first virtual nodes within the first cell from the first feasible set, wherein the second feasible set comprises a plurality of second virtual nodes; and selecting a fourth selected virtual node from the second feasible set.

14. The FD communication system of claim 13, wherein the step of selecting the third selected virtual node comprising:
   selecting the third selected virtual node according to a plurality of initial probabilities corresponding to the plurality of virtual nodes.

15. The FD communication system of claim 14, wherein distribution of the initial probabilities is uniform distribution.

16. The FD communication system of claim 13, wherein the program code is executed by the processing unit to further perform the following steps:
   computing a plurality of transition probabilities corresponding to the plurality of second virtual nodes according to the plurality of virtual pheromonal trails on the plurality of virtual edges, wherein each transition probability is corresponding to a transition from the third selected virtual node to a second virtual node of the plurality of second virtual nodes; and
   selecting the fourth selected virtual node according to the plurality of transition probabilities.

\* \* \* \* \*